United States Patent [19]

Gesinski

[11] 4,080,253
[45] Mar. 21, 1978

[54] EXPANDABLE DEVICE FOR A NUCLEAR FUEL ROD

[75] Inventor: Leonard T. Gesinski, North Huntingdon, Pa.

[73] Assignee: Westinghouse Electric Corporation, Pittsburgh, Pa.

[21] Appl. No.: 725,310

[22] Filed: Sep. 21, 1976

[51] Int. Cl.² .................................. G21C 3/02
[52] U.S. Cl. ........................... 176/68; 176/76; 248/68 R
[58] Field of Search .............. 176/68, 73, 74, 76; 248/68 R, 74 R

[56] References Cited

U.S. PATENT DOCUMENTS

| | | | |
|---|---|---|---|
| 2,947,080 | 8/1960 | Kates et al. | 176/73 X |
| 3,230,152 | 1/1966 | Kerze, Jr. | 176/73 X |
| 3,389,057 | 6/1968 | McGregor et al. | 176/78 |
| 3,519,537 | 7/1970 | Ferrari | 176/68 |
| 3,560,339 | 2/1971 | McHugh | 176/73 |
| 3,679,545 | 7/1972 | Leirvik | 176/73 X |
| 3,801,449 | 4/1974 | Cayol et al. | 176/68 |

Primary Examiner—Peter A. Nelson
Attorney, Agent, or Firm—Edward L. Levine; Z. L. Dermer

[57] ABSTRACT

A nuclear fuel rod and a device for use within the rod cladding to maintain the axial position of the fuel pellets stacked one atop another within the cladding. The device is initially of a smaller external cross-section than the fuel rod cladding internal cross-section so as to accommodate loading into the rod at preselected locations. During power operation the device responds to a rise in temperature, so as to permanently maintain its position and restrain any axial motion of the fuel pellets.

12 Claims, 8 Drawing Figures

EXPANDABLE DEVICE FOR A NUCLEAR FUEL ROD

BACKGROUND OF THE INVENTION

1. Field of the Invention

This invention relates to nuclear fuel, and more particularly provides a nuclear fuel rod and a device for placement within the rod cladding at preselected locations to minimize the movement of fuel pellets within the cladding under irradiation and increased temperature.

2. Description of the Prior Art

Nuclear reactors are presently in operation in which the nuclear fuel is contained in fuel elements of various geometric shape, the most typical being in the form of rods. As such, the fuel material is typically enclosed in an elongated cladding of circular cross-section, which is hermetically sealed at its extremities. Common cladding materials include zirconium and its alloys, stainless steel, aluminum and its alloys, and niobium, among others. The fuel within the cladding is typically in the form of solid sintered pellets, each pellet being generally cylindrical in shape. Various fuel materials are utilized, including uranium compounds such as uranium dioxide, plutonium compounds such as plutonium dioxide, thorium compounds, and mixtures thereof. The pellets are axially stacked one atop another, and a typical fuel rod may contain as many as 272 pellets.

It has been found desirable to also provide a void space or plenum within the fuel rods to compensate for the buildup of fission product and other gases released from the fuel pellets during reactor operation. The usual location of such plenums is at the upper portion of the fuel rods, above the fuel pellets. To minimize the potential for damage to the pellets during fuel transport and installation of the nuclear fuel into a reactor core, a restraining device, such as a helical spring, is typically provided in this upper plenum. Such devices may also be utilized to restrict the axial motion of the fuel pellet stack during reactor operation.

Operating experience with such fuel elements has shown, however, that mere incorporation of such restraining devices is insufficient to maintain axial position of the fuel pellets throughout the stack. Fuel element damage has occurred whereby gaps have been formed between pellets in the stack. This phenomenon has been referred to as "fuel densification", as it has been found that the fuel pellets tend to densify and decrease their initial dimensions, thereby allowing relocation within the cladding. A given pellet may, for example, twist and lodge at a given position within the cladding, while those pellets beneath it cumulatively lower their position. Formation of a gap between pellets not only raises concerns over power distribution and control due to the mislocation of the fuel, but also has resulted in local collapse of the cladding at the gaps due to the high external pressure on the rods.

The most common approaches to alleviating these concerns have been directed to the processes involved in the manufacture of the fuel pellets. Varying steps have been taken to provide pellets at a density closer to the theoretical density that had previously been used. It is desirable, however, and has been the history of the commercial nuclear power industry, to provide redundant means to minimize the possibility of any detrimental occurrences. This invention provides such means in the form of a device which is placed at given locations within the fuel rod, which device maintains its axial position, and therefore the position of the pellets, by frictional forces.

SUMMARY OF THE INVENTION

This frictional device overcomes the above-discussed deficiencies and includes two components, the first of which is a spring member with an external periphery approaching the cross-sectional shape of the fuel cladding, which is typically circular. For such circular cladding, which represents the preferred embodiment, the first component therefore is generally C-shaped. The second component, or gripping member, is affixed within the spring member so as to compress the spring member, allowing simple insertion in a fuel rod at preselected locations during fuel manufacture. During a rise in temperature to a predetermined value, the gripping member releases its compressive grip on the spring member, thereby allowing the spring member to lodge against the internal surface of the fuel cladding and remain in that position due to frictional forces. The device therefore resists any tendency for downward motion of any pellets above it, and similarly resists any tendency for upward motion of any pellets beneath it.

BRIEF DESCRIPTION OF THE DRAWINGS

The functions and advantages of this invention will become more apparent from the following description taken with the accompanying drawings, in which.

DESCRIPTION OF THE PREFERRED EMBODIMENTS

Figure 1:
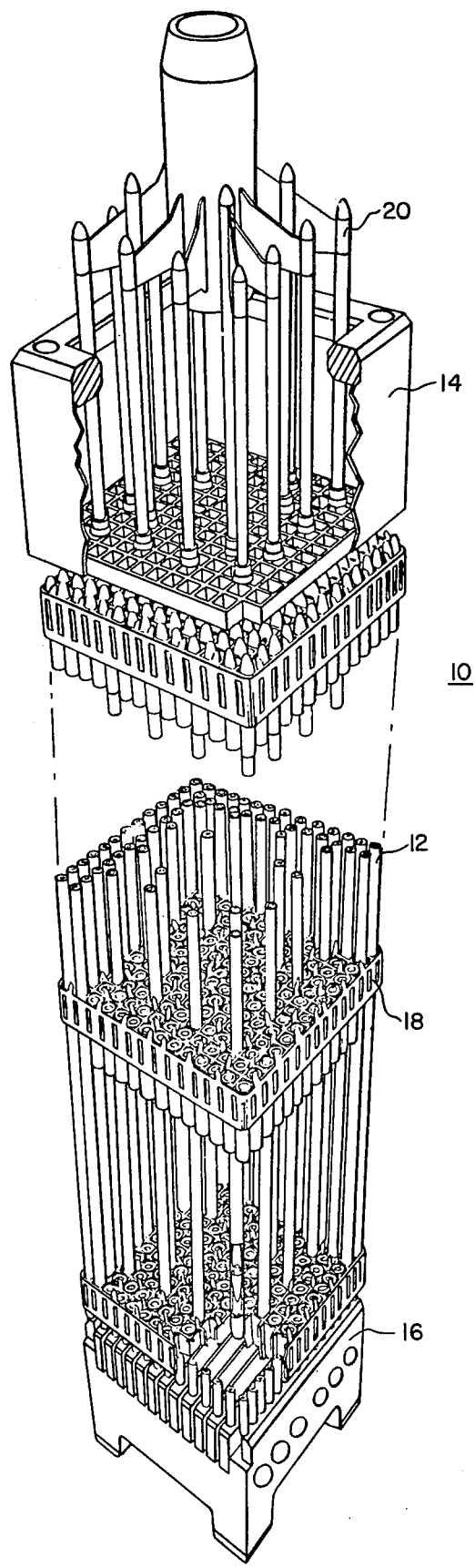
FIG. 1 is a perspective view of a typical nuclear fuel assembly.

Referring now to FIG. 1, there is shown a typical nuclear fuel assembly 10. A plurality of such assemblies are placed adjacent one another to form the core of a nuclear reactor. A coolant is passed through the core which coolant removes heat energy and utilizes it to drive a turbine-generator system. Each fuel assembly 10 includes a plurality of fuel rods 12, supported by a top nozzle 14 and a bottom nozzle 16, and supported along their length by fuel assembly grids 18. The grids 18 function to maintain proper radial alignment of the fuel rods 12, while allowing axial growth, as well as to serve as the contact points among adjacent assemblies. The assembly 10 is shown with a control rod 20 slidably inserted.

Figure 2:
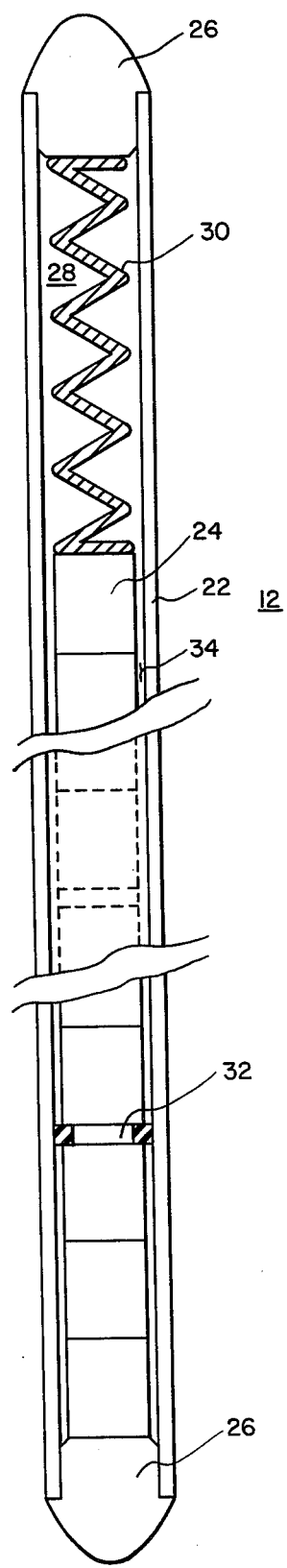
FIG. 2 is a simplified elevation view, partially in cross-section, of a fuel rod of the assembly of FIG. 1.

A typical fuel rod 12 is shown, simplified, in FIG. 2. The components shown include the fuel rod cladding 22, fuel pellets 24, end plugs 26, an upper plenum region 28, and a fuel retention apparatus 30. Also shown is the frictional device 32 of this invention, described in detail hereinafter. As shown, a plurality of fuel pellets 24, typically cylindrical, are stacked within the typically circular cross-section cladding 22, which is hermetically sealed by the end plugs 26. An annular region 34 is provided between the pellets 24 and the cladding 22 to allow for loading of the pellets, movement of gases, and to alleviate undesirable interferences between the pellets and the cladding. The upper plenum region 28 is provided to compensate for the release of fission product and other gases, which otherwise could result in an undesirable pressure buildup within the fuel rod 12. The retention apparatus 30 shown is a helical spring, which helps to maintain the axial position of the pellets 24. Operating experience has shown, however, that the pellets 24 may tend to relocate within the cladding under elevated temperatures and irradiation, leading to potential detrimental effects, including local power maldistribution and local cladding collapse. invention, which includes incorporation of the frictional device 32 at preselected locations within the fuel rod 12, to maintain position of the fuel pellets 24.

Figure 3:
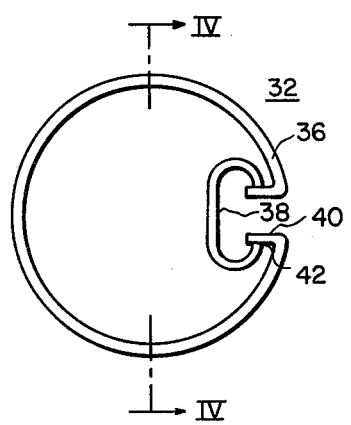
FIG. 3 is a plan view of one preferred embodiment of a frictional device of this invention.
Figure 4:
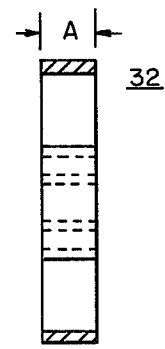
FIG. 4 is a sectional view taken at IV-IV of FIG. 3.

One preferred embodiment of the device 32 is shown in FIGS. 3 and 4. It includes two components, a spring member 36 and a gripping member 38. The spring member 36 is arranged to approach the internal configuration of the fuel rod cladding 22 in its expanded position, and is sized to be slidably inserted into the cladding while in its compressed configuration. The gripping member 38 maintains the spring member 36 compressed for fuel rod fabrication, and responds to a predetermined temperature rise to release its grip and allow the spring member 36 to expand and lodge against the cladding 22, thereafter held in its position by frictional forces.

The spring member 36 shown is generally C-shaped, with a flange 40 projecting inward from each extremity of the "C". It should be of a material that is compatible with the cladding 22 and the fuel rod environment, that has minimal neutron absorption characteristics, and that will maintain its spring strength at temperatures in the range of 1000° F or higher. It should also have a height dimension, denoted "A" on FIG. 4, that is large enough to provide necessary frictional resistance without itself locally deforming the cladding 22, and yet small enough so as not to significantly alter the power distribution if placed between pellets. The device 32 may also be placed just at the top of the pellet stack, in the plenum region 28, where an increased height dimension has a lesser effect on power distribution. The external surface, which lodges against the inside surface of the cladding may be smooth, or intentionally roughened to increase the frictional restraint.

The gripping member 38 is affixed to the flanges 40 so as to initially maintain a compressed configuration. It is attached in a manner that reduces its grip at a predetermined temperature, preferably at about 500° F. This reduction in grip can be the result of manufacturing the gripping member 38 out of a temperature sensitive material that reduces its yield strength at the increased temperature, or that has the necessary thermal coefficient of expansion. Alternatively, the means of attachment can be made temperature sensitive, such as a weld 42 that loses its integrity at elevated temperatures. The former is preferred, however, as reduction in weld or other attachment strength could cause the two members to undesirably separate. Typical materials of construction could be a spring member 36 of a nickel base alloy such as Inconel 716 and a gripping member 38 of carbon or temperature sensitive stainless steel. The outside diameter of the C-shaped member 36 is sized to expand and lodge within a fuel rod cladding, typically in the range of four tenths of an inch. The height dimension for a device inserted between pellets should be no less than one-eighth of an inch, and no greater than three-eighths of an inch. A device 32 placed in the plenum region 28, or below the pellet stack, may have a greater height dimension. The gripping member 38 may have a height dimension less than or equal to the height dimension of the spring member 36. The thickness of the spring member 36 may be in the range of 0.02 inch. The device should preferably be positioned at elevations within the fuel rod where there is a depression in neutron flux and power, such as at the grid locations. Thus located, there may be approximately seven devices 32 along the length of a typical fuel rod, which is typically in the range of one hundred and sixty inches. To maintain fuel pellet position in such fuel rods 12, the frictional device 32 should maintain a device-to-cladding load, approximately symmetrical, of between twenty to forty pounds. It should here be noted that the frictional device 32 is preferably in its compressed configuration only once, prior to the first rise in temperature to the predetermined value. Subsequently, it remains expanded. Therefore, the gripping member 38 could expand and fail, thereby relieving its hold on the spring member.

It will be apparent from the foregoing that many alternate configurations of a frictional device 23 may be utilized and function as disclosed herein. Two such alternates, denoted 32a and 32b, are shown in FIGS. 5 through 8.

Figure 5:
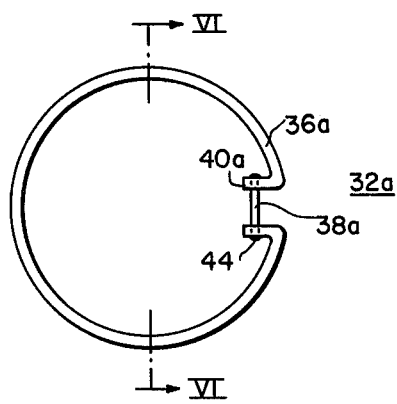
FIG. 5 is a plan view of another preferred embodiment of a frictional device of this invention.
Figure 6:
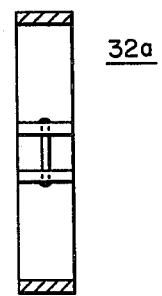
FIG. 6 is a sectional view taken at VI-VI of FIG. 5.

FIGS. 5 and 6 show a frictional device 32a with a spring member 36a similar to that of FIG. 3, including flanges 40a. The gripping member 38a is here, however, affixed through the flanges 40a, as shown. It may be attached by heads 44 in a manner similar to a rivet, or welded into place.

Figure 7:
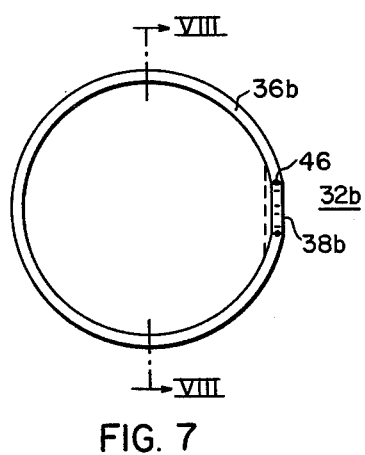
FIG. 7 is a plan view of yet another preferred embodiment of a frictional device of this invention; and, FIG. 8 is a sectional view taken at VIII-VIII of FIG. 7.
Figure 8:
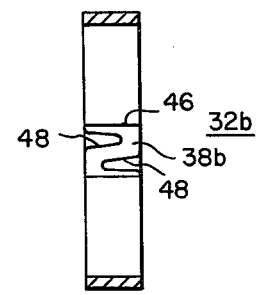

FIGS. 7 and 8 show a frictional device 32b including a C-shaped spring member 36b without flanges. The edges of the "C" are affixed, by means such as welds 46, to the gripping member 38b. The gripping member 36b here inludes notches 48 which assist in the expansion at the predetermined temperature. The gripping member 38b is shown affixed to the edges of the spring member 36b, although it could also be affixed to the inside surface as denoted by the dashed line of FIG. 7.

It will be apparent that many other modifications and variations are possible in view of the above teachings. It therefore is to be understood that within the scope of the appended claims the invention may be practiced other than as specifically described.

I claim:

1. A fuel rod for a fuel assembly of a nuclear reactor comprising:
   a. an elongated hermetically sealed tubular cladding,
   b. a plurality of fuel pellets disposed one atop another within said cladding, and
   c. radially expandable means slidably positionable within said cladding adjacent at least one of said pellets and subsequently radially expandable due to a rise in temperature to a predetermined level so as to lodge against the inside surface of said cladding and maintain its position due to frictional forces.

2. The fuel rod of claim 1 wherein said expandable means is positioned between two of said pellets.

3. The fuel rod of claim 1 wherein said cladding includes a cladding internal cross-section and the external periphery of said expandable means approaches the shape of said cladding cross-section in its expanded configuration.

4. The fuel rod of claim 3 wherein said cladding cross-section is circular.

5. A fuel rod for a fuel assembly of a nuclear reactor comprising:
   a. an elongated heremetically sealed tubular cladding having a circular internal cross-section,
   b. a plurality of fuel pellets disposed one atop another within said cladding, and
   c. expandable means within said cladding positioned adjacent at least one of said pellets, said means comprising a spring member with a generally C-shaped cross-section and a gripping member affixed between the extremities of said C-shaped cross-section, said gripping member initially maintaining said spring member in a compressed configuration and expanding upon a rise in temperature so as to allow said spring member to expand and lodge against said internal cross section of said cladding.

6. The fuel rod of claim 5 wherein said spring member comprises flanges extending inward from the extremities of said C-shaped cross-section and said gripping member is affixed between said flanges.

7. An expandable device for maintaining the elevation position of at least some of a plurality of generally cylindrical nuclear fuel pellets stacked atop one another within an elongated hermetically sealed fuel rod cladding, said cladding having a generally circular cross-section, said device positioned within said cladding atop at least one of said pellets and comprising a spring member of generally C-shaped cross-section and a gripping member, said gripping member affixed to said spring member and maintaining said spring member in a compressed configuration until a rise in temperature to a predetermined level, and then expanding so as to allow said spring member to expand and lodge against the inside surface of said cladding and maintain its position due to frictional forces.

8. The expandable device of claim 7 wherein said gripping member expands to a failed condition.

9. A fuel rod for a fuel assembly of a nuclear reactor comprising:
   a. an elongated tubular cladding having a circular cross-section,
   b. means to hermetically seal said cladding,
   c. a plurality of cylindrical nuclear fuel pellets disposed one atop another within said cladding, and
   d. at least one expandable frictional device disposed between said pellets, said device comprising a spring member with a generally C-shaped cross-section having flanges extending inward from each of the two extremities of said C-shaped cross-section, and a temperature sensitive gripping member initially maintaining said spring member in a compressed configuration and subsequently allowing said spring member to expand upon a rise in temperature to a predetermined level so as to lodge against the internal surface of said cladding cross-section and maintain its position due to frictional forces.

10. The fuel rod of claim 1 wherein said radially expandable means is substantially incompressible along its axial direction.

11. A fuel rod for a fuel assembly of a nuclear reactor comprising:
    a. an elongated hermetically sealed tubular cladding,
    b. a plurality of fuel pellets disposed one atop another within said cladding, and
    c. expandable means within said cladding shaped as a split cylinder and positioned adjacent at least one of said pellets, said means being initially in a compressed configuration and expanding radially upon a rise in temperature to a predetermined level so as to lodge against the inside surface of said cladding and maintain its position due to frictional forces.

12. A fuel rod for a fuel assembly of a nuclear reactor comprising:
    a. an elongated hermetically sealed tubular cladding,
    b. a plurality of fuel pellets disposed one atop another within said cladding, and
    c. expandable means within said cladding positioned adjacent at least one of said pellets, said means including a spring portion and a gripping portion associated with said spring portion so as to maintain said spring portion in a compressed configuration, said gripping portion relieving its grip upon said spring portion due to a rise in temperature to a predetermined level so as to allow said spring portion to radially expand and lodge against the inside surface of said cladding and maintain its position due to frictional forces.

* * * * *